Figure 1:
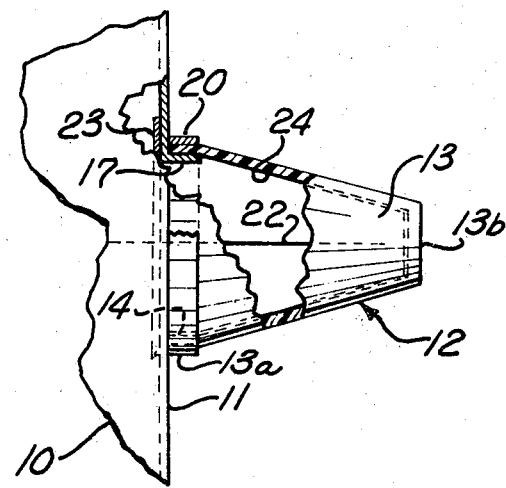

United States Patent [19]
Stephan

[11] 3,898,464

[45] Aug. 5, 1975

[54] ION CHAMBER INSTRUMENT

[75] Inventor: Donald Henry Stephan, Cleveland, Ohio

[73] Assignee: VLN Corporation, Cleveland, Ohio

[22] Filed: Mar. 25, 1974

[21] Appl. No.: 454,177

Related U.S. Application Data

[63] Continuation of Ser. No. 269,702, July 7, 1972, abandoned.

[52] U.S. Cl. .................. 250/374; 313/93; 313/356
[51] Int. Cl. ............................................. G01t 1/18
[58] Field of Search ...... 250/374, 336; 313/93, 355, 313/356

[56] References Cited

UNITED STATES PATENTS

| 2,683,234 | 7/1954 | Lynch | 313/93 |
| 2,974,248 | 3/1961 | Auxier et al. | 313/93 |
| 3,372,295 | 3/1968 | Sparks | 313/93 |

*Primary Examiner*—Archie R. Borchelt

[57] ABSTRACT

An electrical ionization chamber having a self-supporting wall of cellular material which is of uniform areal density and formed of material, such as foamed polystyrene, having an average effective atomic number between about 4 and about 9, and easily replaceable when on the instrument.

16 Claims, 2 Drawing Figures

PATENTED AUG 5 1975          3,898,464

ION CHAMBER INSTRUMENT

This is a continuation of application Ser. No. 269,702 filed July 7, 1972 now abandoned.

The present invention relates to instruments for measuring radiation which embody a cavity ionization chamber.

Compact light weight field instruments and survey meters use cavity ionization chambers to measure ionizing types of radiation. The ability of these instruments to measure the radiation can be very dependent on the energy of the radiation and conventional instruments normally have a poor low energy response, particularly over a large angle of incidence.

When measuring radiation, it is generally desirable to have an "air equivalent" detector since the standard unit of radiation measurement is based on the effect of radiation in a free air ionization chamber. To provide an air equivalent detector chamber for the conventional air-filled radiation detector such as an air proportional counter, it is important to have a wall of material with an average effective atomic number close to air and of low areal density if the chamber is to be energy independent for low energies. Areal density is a term used to indicate the mass of the wall material per unit area through which the radiation must pass when perpendicularly incident to the wall.

One of the problems in such instruments has been to provide walls for the ionization chambers, which have the proper average effective atomic number and which also provide a proper response for a wide solid angle of incidence at low energies. Moreover, the cavity chambers are physically exposed and when damaged must be replaced. Consequently, it is desirable to have a low cost chamber which can be quickly and economically replaced.

Various plastic materials have the proper average effective atomic number for use as wall materials. However, to provide the proper areal density, only thin solid sheets of the materials have been used as walls for receiving incident radiation. However, such thin solid materials do not have sufficient strength to be used as self-supporting walls and have been used in the form of windows supported in other wall structures or as coverings over a skeleton frame. Windows make the instrument highly directional and limit the angle of incidence to which the ion chamber will respond. While ion chambers have been constructed where thin material, as used for the windows, is supported by a framework of ribs, or the like, to form a wall having a solid angle of wider incidence than that provided by a window, the ribs provide a non-uniform areal density and an areal density higher than desirable. Moreover, such a chamber wall is relatively fragile and easily damaged.

Certain thin plastics have also been used to form a vacuum molded chamber with a thin plastic wall which embodied a reinforcing or connecting flange about the chamber. These chambers, however, are relatively fragile and quite easily deformed.

The response of the instrument to radiation is affected by the physical size and geometry of the ionization chamber. Consequently, it is important that the material used to form the wall of the ionization chamber have good resistance to permanent deformation.

In addition to the above, the inside wall of the chamber has a continuous coating of electrically conducting material such as colloidal graphite and, accordingly, should desirably be a non-porous surface with respect to the graphite coating so as to enable a continuous coating.

For certain purposes, it is also desirable that the instrument have a tissue equivalent response, as when measuring radiation to determine its effect on the human body. In this case, the wall of the chamber should have an average effective atomic number close to that of tissue.

SUMMARY OF THE INVENTION

The present invention provides a low cost ion chamber in a radiation measuring instrument which has a cellular wall of a construction to provide a self-supporting wall of a low areal density and one in which the areal density is substantially uniform throughout the extent of the wall intended to receive radiation. In the preferred form of the invention, the wall is formed of cellular plastic having an average effective atomic number in the range of 4–9 to approximate the average effective atomic number of air or human tissue and the wall preferably provides an enclosure having a wall of uniform areal density over a wide solid angle, for example, $2\pi$ steradians. In a specific embodiment of the preferred form of the invention, the ion chamber comprises a seamless wall which has a uniform thickness, is substantially a truncated cone closed at one end to provide an angle of incidence of $2\pi$ steradians, and is of foamed plastic made of closed cells, such as polystyrene which has been expanded in a mold, to provide a smooth inside non-porous surface to the extent necessary for a substantially continuous electrical coating of the chamber.

Figure 2:
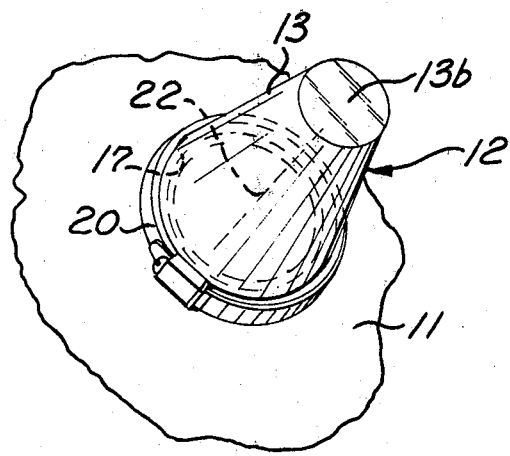

Further objects and advantages of the present invention will be apparent from the following detailed description of a specific form of the preferred embodiment taken in conjunction with the accompanying drawings in which:

FIG. 1 is a fragmentary illustration of an instrument embodying the present invention; and FIG. 2 is a fragmentary perspective view of the instrument of FIG. 1.

Referring to the drawing, a radiation measuring instrument is illustrated as comprising a housing 10 for the electrical circuitry of the instrument and an ionization chamber 12 which projects outwardly from a wall 11 of the housing.

The ionization chamber 12 projects outwardly from the wall 11 and has a chamber wall 13 which is in the form of a seamless truncated cone having an open base 13a adjacent the wall 11 and a closed outer end 13b. The housing wall 11 has lip means 17 projecting outwardly adjacent the base 13a to fit inside the open base end of the truncated cone shaped chamber 12.

The ionization chamber 12 is held onto the housing 10 by a clamp band 20 which encircles the ionization chamber adjacent its open end and clamps the chamber against the lip means 17. It will be noted that no seals are provided for the chamber and that the latter also freely opens into the instrument housing. Accordingly, air is used as the ionizable medium in the chamber.

As is true in the conventional ion chamber, a charge collecting electrode 22 extends from the housing 10 coaxially of the chamber and is connected to the electrode measuring circuitry, for example, proportional measuring circuitry, in the housing 10. The electrode 22 may be supported by electrical insulating material 23 closing an opening 14 in the housing wall 11. In addition, the chamber wall has a conventional inside coating 24 of colloidal graphite or other electrically conducting material. Such conventional coatings are usually between ½ and 1 mil. The coating is substantially continuous over the entire inside wall.

In accordance with the specific form of the preferred embodiment disclosed herein, the wall of the ionization chamber 12 is formed of foamed plastic material, e.g., expanded polystyrene, and is seamless for the angle of incidence of radiation to which the instrument is to respond. The foamed plastic material has a low areal wall density, e.g., 0.017 grams per square centimeter for a 0.10 inch thick wall, which is substantially uniform throughout the radiation receiving wall of the ion chamber. Uniform areal density is highly desirable since variations in areal density will render the response of the instrument dependent on the angle of incidence of the radiation. In practice, the wall is preferably formed of expanded plastic having uniform density and uniform thickness. The expanded plastic is of a construction to provide a substantially non-porous inner wall for the graphite coating, i.e., non-porous to the extent necessary to provide a substantially continuous support for the coating of colloidal graphite. In the specific form of the preferred embodiment, the closed cellular structure of the polystyrene provides such a substantially non-porous wall surface for the colloidal graphite. Expanded plastics having a normally open-cell structure may be skinned over, utilizing practices well known in the art, to provide such a non-porous inner wall.

In addition to having uniform areal density, the wall thickness is preferably of one piece which eliminates seams, fastening means, cementing, etc., which, when used, results in non-homogenous areal densities for the wall and a potentially weaker structure subject to deformation.

In a specific form of the preferred embodiment, the average effective atomic number of the wall is about 6, which compares with an effective atomic number for air of 7.64, muscle being 7.42 and subcutaneous fat 5.92. However, the average effective atomic number for the wall may range from about 4 to about 9.

Foamed polystyrene as used in commercial throw-away coffee cups has proved to provide a highly satisfactory chamber wall.

It will be appreciated that the use of a foamed plastic material not only provides an ion chamber having a wall which has a low areal density and an average effective atomic number close to that of air and which is selfsupporting and of uniform thickness and density, but it also provides a very economical structure. The instrument is constructed so that the foamed plastic chamber can be readily removed in the field by merely unclamping the clamp band 20 and a new chamber installed by merely placing it in position and securing the clamp band therearound. Consequently, if the chamber wall is damaged, it can be readily replaced at a low cost, the cost of the foamed plastic material suitable for use in the invention being essentially that of a foamed polystyrene throw-away coffee cup. The present invention, therefore, provides an inexpensive replaceable ionization chamber.

Not only is the ionization chamber replaceable but the foamed structure of the wall provides a resilient structure which is resistant to permanent deformation thereby increasing the life or usefulness of the chamber wall when subjected to deforming forces as compared to other similar types of field chambers described above.

Foamed cellular plastic material also provides a chamber wall having dimensional stability. This is important for maintaining the accuracy of the instrument over the long term.

An ionization chamber of the type described is particularly useful in measuring low energy photons, including photons having energy of 6–10KeV, while maintaining strong mechanical characteristics and high sennsitivity.

It will be understood that other cellular materials may be used, for example, expanded organic polymeric materials such as polyethylene, polypropylene, epoxys and phenolics, these plastics having average effective atomic numbers of 5.4, 5.4, 6.2 and 6.1, respectively. For radiation purposes, the average effective atomic number is calculated as the approximate cube (2.94) root of the sum of the atomic mass and charge weighted fractions of the individual atomic numbers approximately cubed (2.94).

What is claimed is:

1. A combined wall and electrode for use in forming an enclosing wall of air ionization chambers in a radiation measuring instrument, said wall to be penetrated by the radiation to be measured and having outer and inner surfaces, said wall being of cellular self-supporting material having a substantially uniform areal density and an electrically conducting coating on said inner surface, said material having an average effective atomic number of between about 4 and about 9.

2. A combined wall and electrode as defined in claim 1 wherein said wall material is formed of an expanded organic polymeric plastic.

3. A combined wall and electrode as defined in claim 2 wherein said material is expanded polystyrene and said inner surface is non-porous.

4. A combined wall and electrode as defined in claim 1 wherein said wall is a seamless one piece wall subtended by a solid angle.

5. A combined wall and electrode as defined in claim 2 wherein said wall is a seamless one piece wall subtended by a substantially solid angle and defining a chamber open at one side only.

6. A combined wall and electrode as defined in claim 3 wherein said wall is a seamless one piece wall subtended by a solid angle.

7. A combined wall and electrode as defined in claim 2 wherein said chamber is a truncated cone in shape.

8. In an electrical instrument having a housing for electrical measuring circuitry and an ionization chamber protruding therefrom, said ionization chamber comprising a cellular wall to be penetrated by the radiation to be measured and subtended by a solid angle, said wall being comprised of a self-supporting cellular material having a substantially uniform areal density, and an average effective atomic number of between about 4 and 9, and means for detachably connecting said chamber to said housing.

9. In an electrical instrument as defined in claim 8 wherein said wall is comprised of an organic polymeric plastic.

10. In an electrical instrument as defined in claim 9 wherein said plastic is expanded material.

11. In an electrical instrument as defined in claim 10 wherein said material is expanded polystyrene.

12. In an electrical instrument as defined in claim 9 wherein said chamber is frusto-conical in shape having an open end adjacent said housing and a closed end remote therefrom.

13. In an electrical instrument as defined in claim 12 wherein said material is expanded polystyrene.

14. A combined wall and electrode as defined in claim 5 wherein said solid angle is $2\pi$ steradians.

15. A combined wall and electrode as defined in claim 14 wherein said wall material has an areal density of about 0.017 grams per square centimeter per 0.010 inch of thickness.

16. In an electrical instrument as defined in claim 10 wherein said ionization chamber has an electrode coating on said wall and a second electrode within said chamber and spaced from said wall, said material of said wall being one piece and having an areal density of about 0.017 grams per square centimeter per 0.010 inch of thickness and said solid angle being $2\pi$ steradians and said wall defining a chamber open at one end only.

* * * * *